United States Patent Office 3,283,784
Patented Nov. 8, 1966

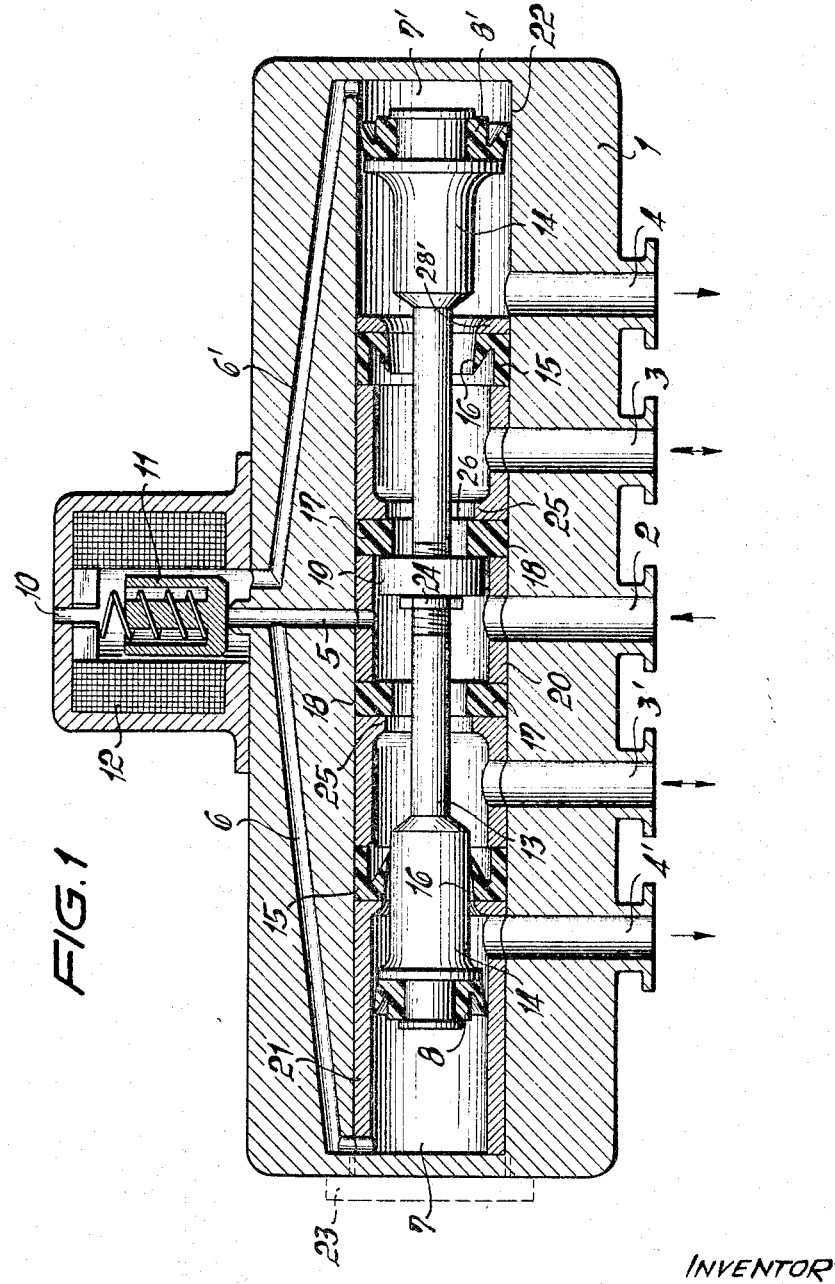

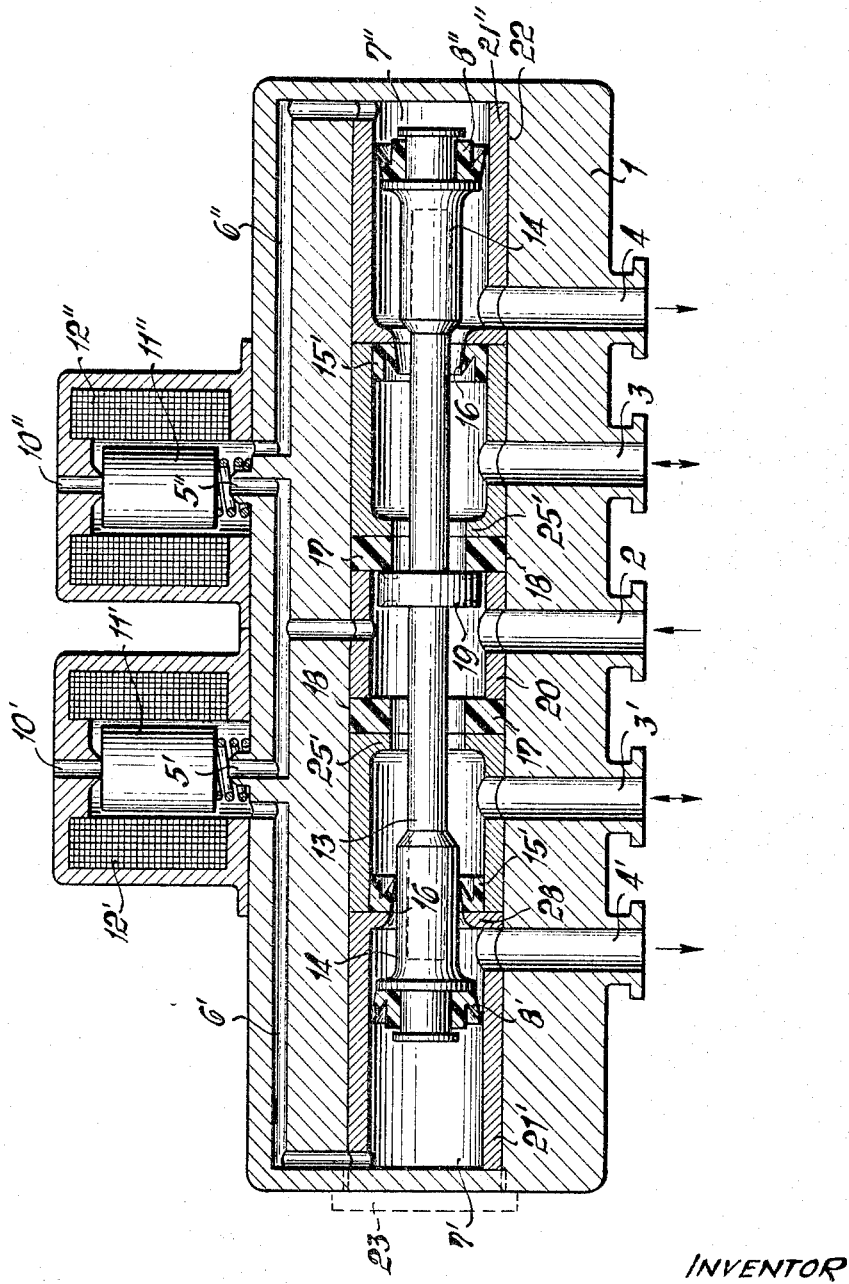

3,283,784
CONTROL VALVE FOR HYDRAULIC MACHINERY
Erich Ruchser, Rommelshausen, Germany, assignor to Erich Herion, Stuttgart-Fravenkopf, Germany
Filed Oct. 16, 1964, Ser. No. 404,387
Claims priority, application Germany, Feb. 18, 1964, H 51,728
8 Claims. (Cl. 137—625.64)

This invention relates to control valves of a type commonly employed in hydraulic machinery, and more particularly to a valve suitable for alternatingly connecting a source of fluid under pressure to one of two conduits while venting the other conduit to a sump or a return line.

The useful life of control valves of the type discussed is determined in part by failure of seals between movable valve parts. It is therefore an object of this invention to provide a control valve capable of long service without repair or maintenance work because of the small number of seals provided between movable parts.

Another object, capable of achievement because of the paucity of seals, is a very compact control valve.

Yet another object is an arrangement of seals or gaskets which minimizes wear of such sealing elements by frictional contact with moving valve parts.

A further object is the use of resilient sealing elements as abutments which limit the movement of the movable valve parts, and which damp such movements because of their resiliency.

An additional object is the provision of pressure fluid locking means which lock the valve in its several operative positions after movement to each position has been actuated.

With these and other objects in view, the invention in one of its aspects provides a valve casing having a cavity therein. An inlet for fluid pressure communicates with one portion of the cavity, two outlets communicate with second and third portions, respectively, of the cavity, and two return openings in the casing communicate with a fourth and a fifth cavity portion respectively. Two annular sealing lip members are respectively interposed between the cavity portions communicating with respective outlets and return openings, that is, between the second and fourth, and between the third and fifth cavity portions.

Supporting means movable in the cavity between a first and a second position are connected to two plungers and a disk valve in such a manner that one plunger is sealingly received in one sealing lip member and thereby seals one outlet from the corresponding return opening when the supporting means is in the first position. The disk valve simultaneously seals the third cavity portion from the first portion. When the supporting means is in its second position, the other plunger is sealingly received in the other lip member and the disk valve seals the second cavity portion from the first one. Suitable means are provided for actuating movement of the supporting means between the afore-described first and second positions.

Other features and advantages of the invention will hereinafter become more fully apparent from the following description of the annexed drawings which illustrate preferred embodiments, and in which:

FIG. 1 shows a first control valve of the invention in elevational section; and

FIG. 2 shows another control valve of the invention in a view corresponding to that of FIG. 1.

Referring now to the drawing in detail, and initially to FIG. 1, there is seen a heavy-walled valve casing 1. A cylindrical cavity 22 extends from one end face of the casing almost to the opposite end face. The open end of the cavity 22 is sealed by a threaded plug 23. The cavity is axially divided into five symmetrically arranged chambers by four annular sealing elements of resilient gasket material.

A first, central chamber is axially defined by two rings 17 of rectangular cross section spaced from each other by a tubular liner 20. The rings 17 have outer cylindrical faces 18 in sealing engagement with the casing 1 under the resilient force of each ring, and cylindrical central openings 26. A second chamber to the left of the central chamber, as viewed in FIG. 1, and a third chamber axially offset toward the right from the first chamber are radially bounded by respective tubular lines 25 having integral inwardly projecting flanges in abutting engagement with a radial face of the corresponding ring 17. The opening in the flanged liners 25 is only slightly larger than that of the associated ring.

A lipped sealing ring 15 between the afore-mentioned second chamber and an axially adjacent fourth chamber is held in its axial position between the liner 25 in the second chamber and a flanged liner 21 which axially abuts against the plug 23, and whose internal flange 28 backs the sealing lip member 15 against pressure in the second chamber.

The sealing ring 15 is of approximately V-shaped axial section. An outer cylindrical portion sealingly engages the wall of the casing 1 in the cavity 22. An inner portion integral with the outer portion tapers inward of the second chamber toward a free annular edge which is radially spaced from the cylindrical portion. In the relaxed condition of the sealing lip member 15, the diameter of the circular opening thereof is slightly smaller than is shown in the left-hand portion of FIG. 1.

An identical sealing ring 15 is arranged between the aforementioned third chamber to the right of the central chamber in FIG. 1 and a fifth chamber which extends to the closed end of the cavity 22. A ring 28' fixedly attached to the casing 1 in the fifth chamber backs the associated sealing ring 15 and limits the movement of the axially aligned liners and sealing elements inward of the cavity 22 when the plug 23 is tightened. The inner edges of the flange 28 and of the ring 28' are beveled and are flush with the inner faces of the rings 15 to form a point passage 16 continuously tapering toward the central first chamber.

Radially aligned bores in the casing 1 and the liner 20 provide an inlet 2 for fluid under pressure to the center of the first chamber. Two sets of corresponding bores in the casing and the liners 25 provide outlets 3', 3 for the fluid from the second and third chambers. The leftmost fourth chamber communicates with a return opening 4' in the casing 1 through an aligned aperture in the liner 21. The fifth chamber at the far right of FIG. 1 lacks a liner and communicates directly with a return opening 4 in the valve casing.

Two pistons 8 and 8' divide the fourth and fifth chambers into two cylindrical compartments each. The compartment 7 radially bounded by the liner 21, and axially bounded by the plug 23 and the piston 8 is smaller in diameter than the otherwise analogous compartment 7' which lacks a liner. The pistons 8, 8' correspondingly differ in effective area and are constituted by respective lipped sealing rings closely similar to the afore-described members 15. The inner edge-forming portions of the pistons 8, 8' taper respectively toward the compartments 7, 7'.

The pistons 8, 8' are fixedly mounted on the ends of a cylindrical supporting rod 13 coaxial with the cavity 22. The rod 13 also carries two plungers 14 whose main portions are cylindrical and equal in diameter. The plungers are axially contiguously adjacent the pistons 8, 8'. Their ends remote from the associated pistons are conically beveled. The plungers 14 are slightly greater in cross sectional area than the openings of the sealing rings 15 in the relaxed condition of the latter.

A cylindrical valve disk 19 is mounted on the axially central portion of the rod 13 by means of a collar 24 which is threadedly adjustable on the rod 13 and which may be secured in the adjusted position by a set screw (not shown) in a conventional manner. The diameter of the disk 19 is substantially greater than that of the openings in the rings 17 and greater than that of the openings in the flanges of the liners 25. Abutment of a radial end face of the disk 19 against a corresponding face of one or the other ring 17 thus limits the stroke of the rod 13 in the casing 1, and the range of movement of the several valve elements carried by the rod may thus be modified by adjusting the axial position of the disk 19.

A radial bore 5 in the casing 1 permanently communicates with the central chamber of the valve through a corresponding opening in the liner 20. A permanently open duct 6 connects the bore 5 with the compartment 7, and thus provides permanent communication between the compartment and the inlet 2.

In the illustrated first operative position of the apparatus, the outer orifice of the bore 5 is blocked by the spring biased armature 11 of a pilot valve which also includes a solenoid 12 and a liquid-tight housing having a discharge opening 10. A duct 6' in the casing 1 connects the opening 10 with the compartment 7' and thereby vents the compartment. When the solenoid 12 is energized, the armature 11 moves away from the orifice of the bore 5 and closes the discharge opening 10, while connecting the duct 6' to the bore 5.

The afore-described control valve is particularly suitable for selectively admitting hydraulic pressure fluid to one of the two working chambers of a double-acting hydraulic cylinder while returning fluid from the other chamber, and vice versa. In such an application, the inlet 2 is connected to a pump or other source of fluid under pressure, the two outlets 3, 3' are respectively connected to the two cylinder chambers, and the two openings 4, 4', as well as the discharge opening 10 are connected to a low pressure return line or to a sump from which the pump draws pressure fluid.

The control valve is operated as follows:

In the illustrated first operative condition, respective flat annular face portions of the valve disk 19 and of the ring 17 which separates the first and third valve chambers are in sealing engagement. Pressure fluid passes through the annular opening between the rod 13 and the other ring 17 into the second chamber and flows through the outlet 3' to the controlled hydraulic cylinder. The second chamber is sealed from the fourth chamber by a plunger 14 received in the associated sealing ring 15.

The cylindrical compartment 7 is under the full pressure of the fluid entering the intake 2, and the compartment 7' is vented to the sump, through the opening 10 of the pilot valve. The rod 13 and the valve elements mounted thereon are locked in the illustrated position mainly by the liquid pressure in the compartment 7, but also by the forces acting on the disk 19 in the central chamber which are greater than those acting on the smaller opposite effective piston face of the plunger 14 in the second chamber under similar liquid pressure. The third and fifth chambers, including the compartment 7' and the outlet 3 are vented. The disk 19 is firmly held to the engaged ring 17 by the liquid pressure in the first, central chamber.

When the solenoid is energized, both compartments 7, 7' are connected with the inlet 2 and are filled with fluid under the full pressure of the pump, not itself shown. Because of the greater cross sectional area of the cylinder in which the piston 8' operates, the rod 13 is shifted toward the left, as viewed in FIG. 1 until the valve disk 19 abuts against the ring 18 which separates the second valve chamber from the central chamber. Simultaneously, the third and fifth chambers are sealed from each other by engagement of the corresponding plunger 14 and sealing ring 15, and the second and fourth chambers are connected as the associated plunger 14 is driven out of the second chamber and into the fourth chamber.

The wear of the lipped sealing rings 15 is slow because the rings are subjected only to very small pressure differentials while the associated plungers 14 move in a direction of lip taper. The seals subjected to the highest pressure differences are those between the valve disk and the flat rings 17 which do not move relative to each other when in frictional engagement. The rings 17 are structurally well suited for abuttingly limiting the stroke of the rod 13 and of the valve elements supported thereon, and act as resilient dampers or shock absorbers.

The modified valve shown in FIG. 2 has a casing 1 equipped with a central inlet 2, paired controlled pressure fluid outlets 3, 3' and return openings 4, 4' substantially identical with the corresponding elements described with reference to FIG. 1, and communicating with corresponding portions of the cylindrical casing cavity one end of which is closed by a plug 23, and which is lined end to end by symmetrically arranged liners 21', 25', 20, 25', 21" which hold two lipped sealing rings 15' and two rings 17 of rectangular section in their axial positions. This arrangement differs from the one illustrated in FIG. 1 by the provision of identical liners 21', 21" in the two outmost chambers of the valve cavity.

Correspondingly, the rod 13 carries at its ends two identical pistons 8', 8" for axial movement in cylindrical compartments 7', 7". The rod also carries plungers 14 and a valve disk 19 not significantly different in structure or function from the corresponding elements of the first-described valve.

The central chamber of the valve cavity is connected to two pilot valves by a branched duct 5', 5". The pilot valves are spring biased toward the illustrated positions of their respective armatures 11', 11" in which the armatures block respective discharge openings 10', 10" and permit liquid flow from the controlled orifices of the ducts 5', 5" through ducts 6', 6" to the compartments 7', 7". Equal liquid pressure prevails in the compartments 8', 8", and the rod 13 is held in the position shown by the difference in the radial surfaces of the valve disk 19 and of the plunger 14 which are exposed to full pump pressure.

Movement of the rod between the illustrated first operative position and the second position in which the valve disk 19 is shifted toward the left ring 18 is actuated by energizing a corresponding solenoid 12', 12" of the pilot valves. To move the rod 13 from the illustrated first to the second position, the solenoid 12' is briefly energized whereby the compartment 7' is vented through the discharge opening 10', and the pressure of the liquid in the compartment 7" causes the desired movement of the valve which connects the outlet 3 to the inlet 2 while venting the outlet 3' through the return opening 4'.

The solenoid 11' may be de-energized as soon as the valve is shifted, and the valve will remain blocked in its second position by the action of fluid pressure alone. Return to the illustrated position is actuated when the solenoid 12" is briefly energized.

It should be understood, of course, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:
1. A control valve comprising, in combination:
 (a) a valve casing defining a cavity therein, said casing being formed with an inlet communicating with a first portion of said cavity, a first and a second outlet respectively communicating with a second and a third portion of said cavity, and with a first and a second return opening respectively communicating with a fourth and a fifth portion of said cavity;

(b) supporting means movable in said cavity between a first and a second position;

(c) first and second annular sealing lip members respectively interposed in said cavity between said second and fourth and between said third and fifth portions thereof, said sealing lip members sealingly engaging said valve casing;

(d) first and second plunger means connected to said supporting means for movement therewith in said casing, said first plunger means being sealingly received in said first sealing lip member and said second plunger means being spaced from said second sealing lip member, when said supporting means is in said first position thereof, said second punger means being sealingly received in said second sealing lip member and said first plunger means being spaced from said first sealing lip member when said supporting means is in said second position thereof;

(e) disk valve means connected to said supporting means for movement therewith for connecting said first portion of said cavity to said second portion thereof, and for simultaneously sealing said third portion from said first portion when said supporting means is in said first position thereof, and for connecting said first and third portions of said cavity while sealing said second portion from said first portion when said supporting means is in said second position thereof;

(f) two annular gasket members of resilient material sealingly engaging said casing, said gasket members being interposed between said first cavity portion and said second and third cavity portions respectively for respective sealing engagement with said disk valve means in said second and first positions of said supporting means, each of said gasket members having two annular faces, one of said faces being opposite said disk valve means and engageable therewith by movement of said supporting means, and the other face facing away from said disk valve means;

(g) two rigid tubular spacer members in said casing, each spacer member having a flange portion inwardly projecting from said casing, said portion abuttingly engaging said other face of a respective gasket member and defining an opening, (1) said disk valve means including two contact faces respectively engageable with said opposite faces of said gasket members and aligned with the openings of said flange portions respectively in the direction of movement of said supporting means, the cross section of each contact face transversely of said direction being greater than the cross section of the aligned flange opening; and (h) moving means for moving said supporting means between said positions thereof.

2. A valve as set forth in claim 1, wherein said cavity has an axis, said portions thereof are axially offset from each other, and said supporting means include a supporting member axially reciprocable in said cavity and carrying said plunger means and said disk valve means.

3. A valve as set forth in claim 2, wherein said disk valve means include a valve disk having two axially spaced radial faces, said faces respectively engaging said gasket members in said positions of said supporting means.

4. A valve as set forth in claim 2, wherein said disk valve means have two faces transverse of said axis and respectively selectively exposed in said first casing portion when said supporting means is in said first and second portions thereof, and said moving means include cylinder means, a piston mounted on said supporting member for reciprocating movement in said cylinder means, and means for connecting said cylinder means to said inlet, whereby a pressure fluid may act simultaneously on one of said exposed faces of said disk valve means and on said piston, the effective area of said piston transverse of said axis being greater than said one exposed face.

5. A valve as set forth in claim 4, wherein said cylinder means include a tubular liner member sealingly secured in said cavity and movably receiving said piston therein.

6. A valve as set forth in claim 5, wherein said liner member is formed with an opening for radial passage of fluid therethrough, said opening communicating with one of said outlets, and said piston and a portion of said liner member constituting walls of one of said fourth and fifth portions of said cavity.

7. A valve as set forth in claim 6, further comprising an internal integral flange on said liner member abuttingly engaging one of said sealing lip members.

8. A valve as set forth in claim 2, wherein each of said sealing lip members is formed with an axial opening therethrough, said members each having an outer portion remote from said opening and engaging said casing, and a resilient inner portion contiguously adjacent said opening, said inner portions being integral with corresponding outer portions and tapering axially toward respective free annular edges in respective directions inward of said second and fourth portions of said cavity and being each spaced transversely of said axis from the corresponding outer portions.

References Cited by the Examiner
UNITED STATES PATENTS

| | | | |
|---|---|---|---|
| 2,747,611 | 5/1956 | Hewitt | 137—625.69 |
| 2,912,007 | 11/1959 | Johnson | 137—625.64 X |
| 3,142,315 | 7/1964 | Hennells | 137—625.26 X |
| 3,191,626 | 6/1965 | Leibfritz | 137—625.64 X |

FOREIGN PATENTS 1,028,841  4/1958  Germany.

M. CARY NELSON, *Primary Examiner.*

MARTIN P. SCHWADRON, *Examiner.*

R. J. MILLER, *Assistant Examiner.*